United States Patent [19]

Grupp et al.

[11] Patent Number: 5,484,205
[45] Date of Patent: Jan. 16, 1996

[54] TEMPERATURE INDICATOR AND WATCH PROVIDED WITH SUCH A TEMPERATURE INDICATOR

[75] Inventors: Joachim Grupp, Neuchâtel; Jean-Charles Poli, Les Geneveys-sur-Coffrane, both of Switzerland

[73] Assignee: Asulab S.A., Bienne, Switzerland

[21] Appl. No.: 257,299

[22] Filed: Jun. 9, 1994

[30] Foreign Application Priority Data

Jul. 23, 1993 [CH] Switzerland ........................... 2245/93
Jul. 30, 1993 [FR] France .................................. 93 09531

[51] Int. Cl.⁶ .......................... G01K 1/14; G01K 11/12; G04B 47/06
[52] U.S. Cl. ................................ 374/142; 374/162; 368/11
[58] Field of Search ........................... 374/142, 162; 368/11, 10

[56] References Cited

U.S. PATENT DOCUMENTS

| | | | |
|---|---|---|---|
| 370,400 | 9/1887 | McLean | 374/142 |
| 3,177,718 | 4/1965 | Stevenson | 374/142 |
| 3,253,466 | 5/1966 | Chough | 374/142 |
| 3,633,425 | 1/1972 | Sanford | 374/162 |
| 3,661,142 | 5/1972 | Flam | 374/162 |
| 3,665,770 | 5/1972 | Sagi et al. | 374/162 |
| 4,282,591 | 8/1981 | Andreuccetti | 374/142 |
| 4,451,157 | 5/1984 | Reap | 368/11 |
| 4,952,033 | 8/1990 | Davis | 350/351 |
| 5,326,174 | 7/1994 | Parker | 374/162 |
| 5,430,692 | 7/1995 | Grupp et al. | 368/11 |

FOREIGN PATENT DOCUMENTS

| | | | |
|---|---|---|---|
| 2274966 | 1/1976 | France | 368/11 |
| 0019788 | 2/1979 | Japan | 368/11 |
| 61-193039 | 8/1986 | Japan . | |
| 2199981 | 8/1984 | United Kingdom . | |
| 2165646 | 4/1986 | United Kingdom | 374/162 |
| 2135081 | 7/1988 | United Kingdom | 374/142 |

*Primary Examiner*—Diego F. F. Gutierrez
*Attorney, Agent, or Firm*—Griffin, Butler, Whisenhunt & Kurtossy

[57] ABSTRACT

A temperature indicator has a substrate (1) comprising several distinct juxtaposed zones (I to VIII), each being covered by a first thermosensitive material (A) and at least one second thermosensitive material (B, C) each of which reacts within a predetermined temperature range which is different for each zone but of constant scope. There is no overlapping of the temperature ranges of each material is within each zone. Each of the thermosensitive materials (A,B,C) has a portion of its range of reaction temperatures in common with a portion of the temperature range of one of the materials (A,B,C) of an adjacent zone. This overlapping is lower by one step in each of the temperature ranges. With three thermosensitive materials per zone, 24 sensing elements are available, which enables obtaining 18 times a single non-active sensor, namely 18 temperatures at the step resolution. The temperature is read at the side of the non-active zone.

16 Claims, 5 Drawing Sheets

TEMPERATURE INDICATOR AND WATCH PROVIDED WITH SUCH A TEMPERATURE INDICATOR

The invention concerns a temperature indicator constituted by a substrate comprising a plurality of distinct juxtaposed zones which are each covered by a thermosensitive material reacting within a range of predetermined temperatures as well as a watch provided with such a temperature indicator.

BACKGROUND OF THE INVENTION

Temperature indicators are already known using thermosensitive inks composed of thermochromic liquid crystals. Their technology is largely described in the review Handbook of Thermochromic Liquid Crystal Technology, Hallcrest 1991. Such temperature indicators are constituted by a substrate comprising several distinct juxtaposed zones which are each covered by a thermosensitive material reacting for each zone at a predetermined temperature. Such temperature indicators comprise as many zones, and consequently as there are many sensors, as measurable temperature steps. They must thus comprise a large number of sensors in order to be able to indicate a significant range of temperatures such as, for example, 30 sensors for a temperature measurement from 0° C. to 30° C. with a resolution of 1° C. per step. When this type of temperature indicator must be exhibited on an element having a small surface, such as a watch or clock dial as described in the British patent application GB-A-2,135,081, for example, the readability becomes poor because of the substantial number of sensors relative to the dimensions of a watch dial which requires that each sensor have a very small individual surface.

The invention seeks to overcome this drawback in proposing a temperature indicator permitting a relatively precise temperature measurement over a wide temperature range with a reduced number of zones having large individual surfaces.

SUMMARY OF THE INVENTION

To this effect, the invention has as objective a temperature indicator constituted by a substrate comprising a plurality of distinct juxtaposed zones each being covered by a first thermosensitive material reacting within a first predetermined temperature range, said first temperature range being different for each of said zones, characterized in that each of said zones is additionally covered by at least a second thermosensitive material reacting within a second predetermined temperature range, said second temperature range being different for each of said zones, there being no overlapping of said first temperature range with said second temperature range within each zone.

The advantages obtained thanks to this invention consist in that it is possible to measure the temperature in a precise manner over a substantial temperature range with a reduced number of zones, thus diminishing the price of the temperature indicator and in that each sensor has a large individual surface enabling good readability. Furthermore, the temperature indicator presents a highly colourful appearance, thus rendering its aspect very attractive, which is particularly interesting when it is used in connection with a wristwatch.

Other advantages and characteristics of the invention will appear more clearly upon reading the description which follows of the embodiments of the invention, given purely by way of illustration and not intended to be limiting, such description being prepared in connection with the attached drawings.

DESCRIPTION OF THE PREFERRED EMBODIMENTS

Figure 1:
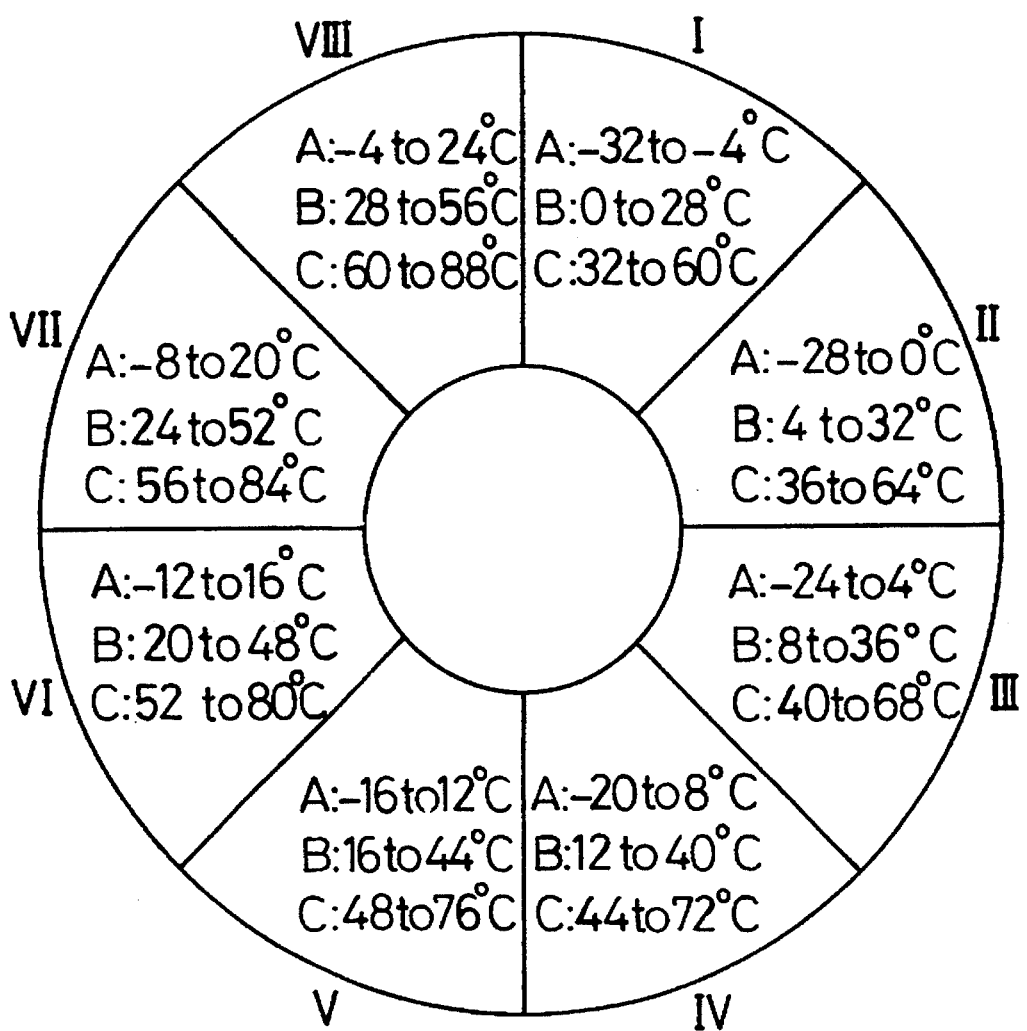
FIG. 1 shows an embodiment of a temperature indicator according to the invention in the form of a ring constituted by eight zones, each comprising three thermosensitive materials.

In FIG. 1, there can be seen a temperature indicator constituted by a substrate 1 in the form of a ring comprising eight distinct juxtaposed zones referred to as sensors I to VIII. These eight sensors are each covered by a first thermosensitive material A, a second thermosensitive material B and a third thermosensitive material C. Such thermosensitive materials are constituted by thermochromic inks, each of which reacts within a predetermined temperature range.

Each of the thermochromic inks A, B and C has the same activity span of 28° C., but in a shifted operational domain. The first thermosensitive material A reacts between −32° and −4° C. in sensor I, between −28° and 0° C. in sensor II and thus continuing up to sensor VIII where it reacts between −4° and 24° C. The thermosensitive material B reacts between 0° and 28° C. in sensor I, between 4° and 32° C. in sensor II and thus continuing up to sensor VIII where it reacts between 60° and 88° C. Thus, in each sensor, it can be seen that the overlapping of the three temperature ranges for which the three thermochromic inks A, B, C react is inexistent. Inks A, B, C, as is well understood, are thus different for each of the sensors I to VIII but are for reasons of convenience designated by A, B, C for all the sensors.

Additionally, it can be seen that ink A of sensor 1 and ink A of sensor II possess a common reaction temperature span between −28° C. and −4° C., such common temperature span having a breadth of 24° C. It can also be seen that ink B of sensor I and ink B of sensor II also possess a common reaction temperature span between 4° and 28° C., such temperature range also having a breadth of 24° C. Thus, each of the inks A, B or C of sensor I exhibits a portion of its reaction temperature range in common with each of inks A, B or C respectively of sensor II, such common temperature span of 24° C. being less by the value of one step than the breadth of the reaction temperature range which is 28° C. for each ink. Each of these three inks A, B or C has thus the same reaction temperature range, but with an operating domain shifted by one step of 4° C. per adjacent sensor.

The following table shows a truth table of the activated state of each of inks A, B and C of each of the sensors 1 to VIII between −34° and 90° C.

|        | I | II | III | IV | V | VI | VII | VIII |
|--------|---|----|-----|----|---|----|-----|------|
| −34° C. | — | — | — | — | — | — | — | — |
| −30° C. | A | — | — | — | — | — | — | — |
| −26° C. | A | A | — | — | — | — | — | — |
| −22° C. | A | A | A | — | — | — | — | — |
| −18° C. | A | A | A | A | — | — | — | — |
| −14° C. | A | A | A | A | A | — | — | — |
| −10° C. | A | A | A | A | A | A | — | — |
| −6° C.  | A | A | A | A | A | A | A | — |
| −2° C.  | — | A | A | A | A | A | A | A |
| 2° C.   | B | — | A | A | A | A | A | A |
| 6° C.   | B | B | — | A | A | A | A | A |
| 10° C.  | B | B | B | — | A | A | A | A |
| 14° C.  | B | B | B | B | — | A | A | A |
| 18° C.  | B | B | B | B | B | — | A | A |
| 22° C.  | B | B | B | B | B | B | — | A |
| 26° C.  | B | B | B | B | B | B | B | — |
| 30° C.  | — | B | B | B | B | B | B | B |
| 34° C.  | C | — | B | B | B | B | B | B |
| 38° C.  | C | C | — | B | B | B | B | B |
| 42° C.  | C | C | C | — | B | B | B | B |
| 46° C.  | C | C | C | C | — | B | B | B |
| 50° C.  | C | C | C | C | C | — | B | B |
| 54° C.  | C | C | C | C | C | C | — | B |
| 58° C.  | C | C | C | C | C | C | C | — |
| 62° C.  | — | C | C | C | C | C | C | C |
| 66° C.  | — | — | C | C | C | C | C | C |
| 70° C.  | — | — | — | C | C | C | C | C |
| 74° C.  | — | — | — | — | C | C | C | C |
| 78° C.  | — | — | — | — | — | C | C | C |
| 82° C.  | — | — | — | — | — | — | C | C |
| 86° C.  | — | — | — | — | — | — | — | C |
| 90° C.  | — | — | — | — | — | — | — | — |

Figure 2:
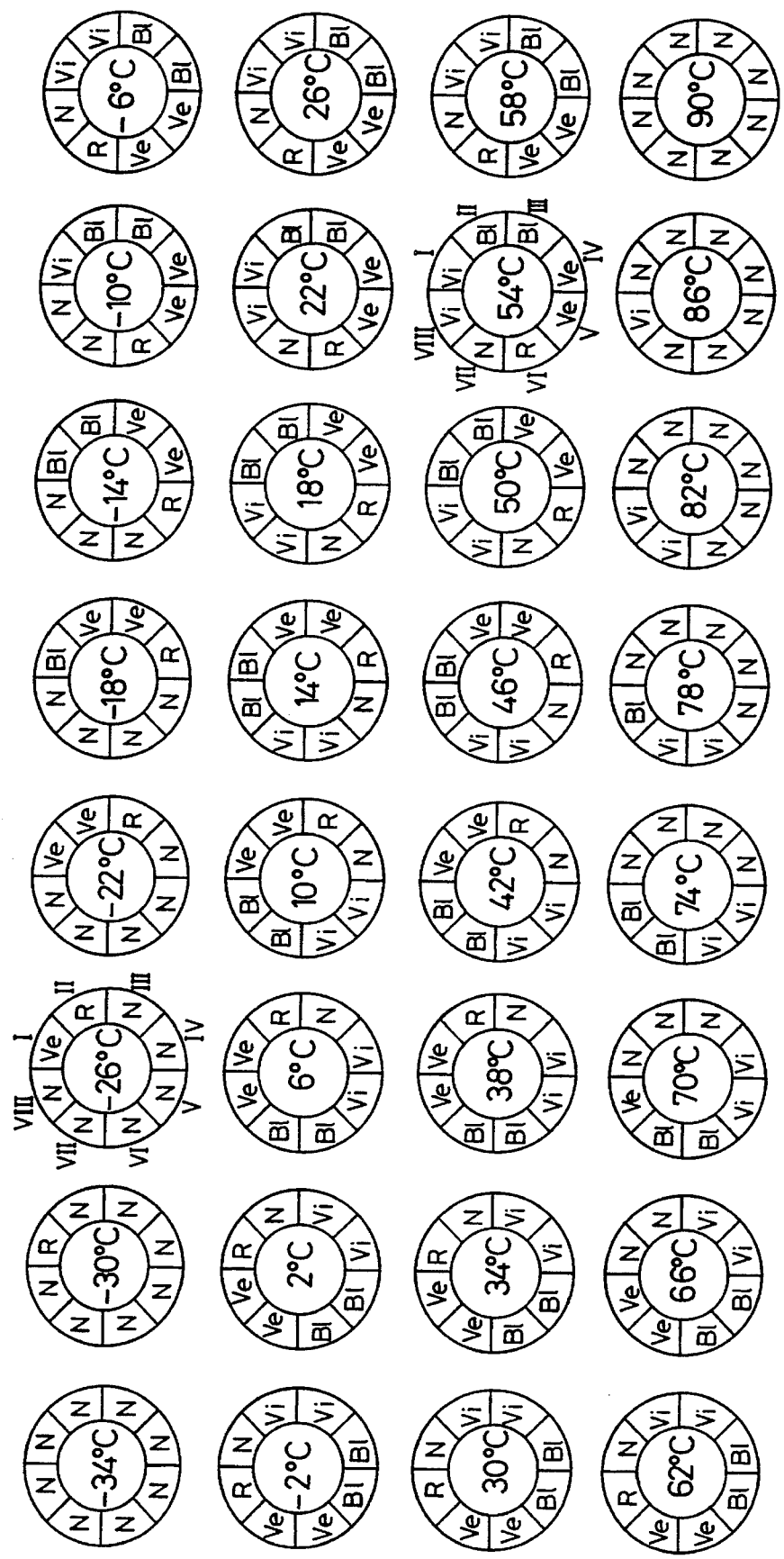
FIG. 2 shows the aspect of the temperature indicator of FIG. 1 at each measurable temperature between −34° C. and 90° C.

The eight sensors of this temperature indicator change colour as a function of the temperature within their span of activity. The temperature range of one circuit of the ring is equal to the number of zones multiplied by the step, thus, 32° C. Each sensor has a span of activity less by 1/ (number of zones) than the range of a circuit of the ring, that is to say, of 4° C. which enables each of such sensors to present no activity, and thus to be the colour of the substrate, in this case black, once per circuit of the ring. When the temperature increases by the value of the step, that is to say, 4° C., such non-active sector becomes coloured; as to the adjacent sensor, it becomes non-active since it reaches the end of its activity span which enables it to obtain one rotation of the colours over the ring. FIG. 2 shows thus the appearance of each sensor of the temperature indicator such as described in figure between −34° C. and 90° C. At −34° C., none of the three inks of each of the sensors reacts and consequently the eight sensors are black, this colour being the colour of the substrate. The colour of an ink in its reaction temperature range varies from red R towards green Ve, blue B and violet Vi in as the temperature increases. Outside its reaction temperature range, the ink is transparent and appears black, this colour being the substrate colour. Thus, at −30° C., ink A of the first sensor I reacts and is red R. At −26° C., ink A of sensor I reacts so as to become green Ve and ink A of sensor II reacts so as to become red, while the three inks of the other sensors III to VIII do not react, such sensors remaining black. At −6° C., ink A is violet Vi in sensor I, violet Vi in sensor II, blue B1 in sensors III and IV, green Ve in sensors V and VI, red R in sensor VII and black N in sensor VIII. Thus, since there are three thermochromic inks per sensor, there are available 24 sensing elements which enable obtaining 18 times a single non-active sensor, that is to say 18 temperatures at the step resolution between −6° and 62° C. The temperature is read next to this non-active sector thanks to a temperature scale, not shown.

Outside such temperature range, that is to say, below −6° C. and above 62° C., the non-active sensors add up which enables an estimation of the temperature by the number of non-active sensors and an increase in the range of temperature measurements. For example, zone IV is the only inactive zone the wearer will observe 42° C. opposite the zone.

If the air feels extremely hot the wearer knows the temperature is 42° C. but if the air is cool then the temperature is 10° C. If more than one zone is inactive, it is an indication that the scale cannot be used. If zones IV through VIII are all inactive and the temperature feels cold to the wearer, he may determine the temperature by adding −4° C. (the temperature decrease required to make another zone inactive) for each inactive zone in excess of one (4 in this example) and adding the result (−16° C.) to the temperature (−6° C.) at which only one zone (zone VIII) is inactive thereby obtaining the temperature −22° C. As a further example, if zones I through VI are all inactive and the temperature feels hot to the wearer, he may determine the temperature by adding 4° C. (the temperature increase required to make another zone inactive) for each inactive zone in excess of one (in this case 5) and adding the result (+20° C.) to the temperature (+62° C.) at which only one zone (zone I) is inactive, thereby obtaining the temperature 82° C.

As can be seen on FIG. 2, the appearance of the ring is identical at certain temperatures as, for example, at −6° C., 26° C. and 58° C. where zone VIII is the only inactive zone. It is nevertheless easy for the user of the temperature indicator to establish the difference between such temperatures.

Figure 6:
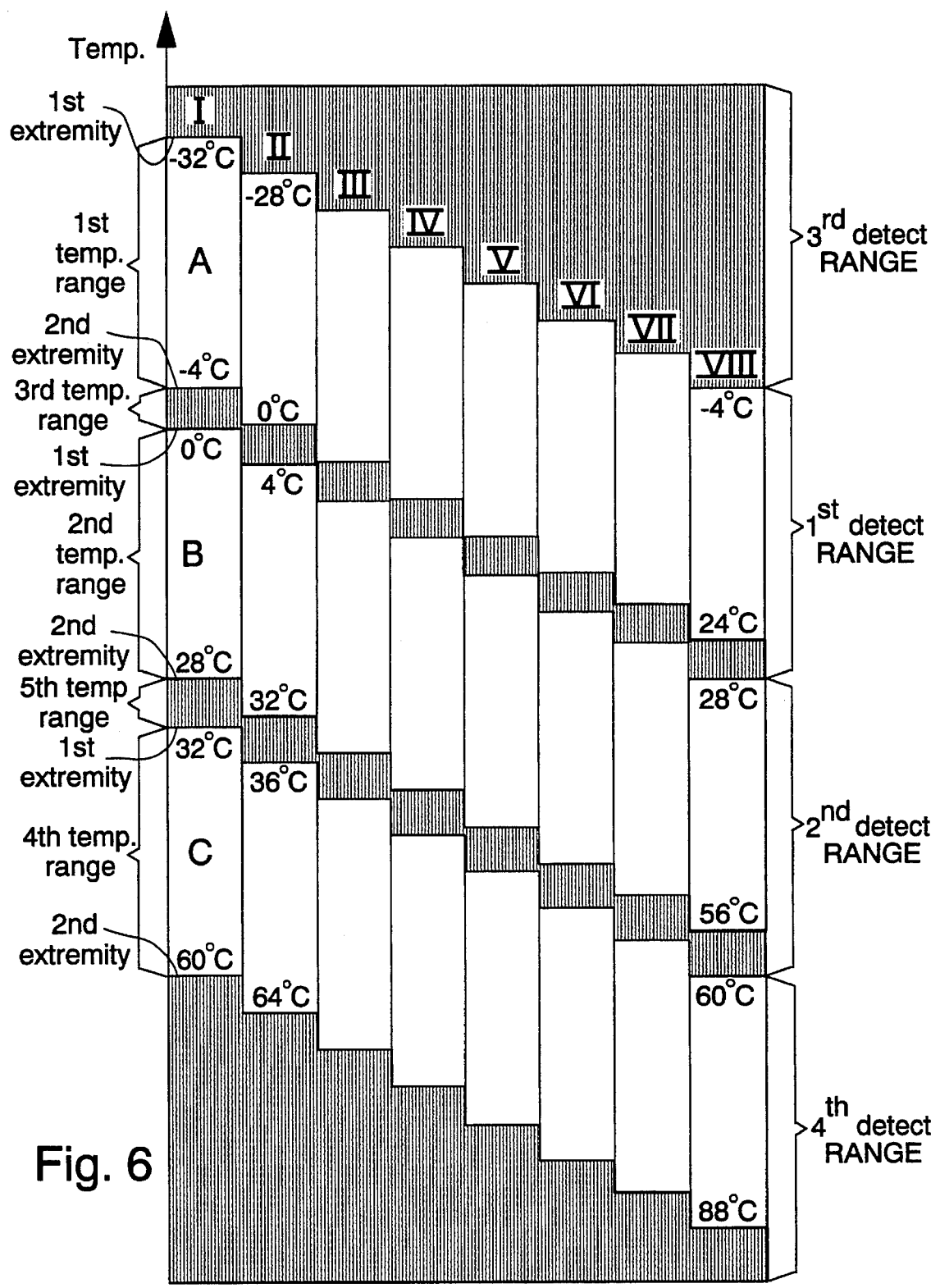
FIG 6 graphically illustrates the relationships of the active temperature range of the three thermosensitive materials in each of the eight zones.

FIG. 6 illustrates, in graphic form, the relationships of the active temperature ranges of the three thermosensitive materials A, B and C for each of the sensors or zones I through VIII. That is, FIG. 6 illustrates visually the information conveyed by the foregoing truth table and FIGS. 1 and 2. As will be evident from the following discussion, the shaded areas in FIG. 6 indicate temperature ranges wherein all thermosensitive materials of a zone are inactive so that the zone appears black on the face of the indicator. From FIGS. 1 and 6, the following observations may be made. In each of the zones I–VIII the zone is covered by first, second and third thermosensitive materials A, B, C which react within first, second and fourth temperature ranges, respectively. In zone I, the first, second and fourth temperature ranges are −32° C. to −4° C., 0° C. to 28° C. and 32° C. to 60° C. respectively. The first or low temperature extremity and the second or high temperature extremity of each temperature range increases by a fixed amount (4° C.) in adjacent zones so that the first, second and fourth temperature ranges in zone VIII have first and second extremities of −4° C. and 24° C., 28° C. and 56° C., and 60° C. to 88° C., respectively. Furthermore, the first and second temperature ranges of the first and second thermosensitive materials in each zone are separated by a third temperature range in each zone, this third temperature range having a breadth of 4° C. The third temperature ranges are non-overlapping, the ranges being between −4° C. and 0° C. in zone I, 0° C. and 4° C. in zone II, and so forth with the third temperature range for zone VIII being between 24° C. and 28° C. These third temperature ranges together form a first detection range within which the temperature may be indicated by one of the zones in which the first and second thermosensitive materials are both inactive.

It may also be observed that except for the second extremity of the first temperature range in the first zone I and the first extremity of the second temperature range in the last zone VIII, the first extremity of the second temperature range in one zone coincides with the second extremity of the first temperature range in an adjacent zone.

The second extremity of the first temperature range in the first zone I coincides with the first extremity of the first temperature range in the last zone VIII while the first extremity of the second temperature range in the last zone VIII coincides with the second extremity of the second temperature range in the first zone I. For example, the first extremity (0° C.) of the second temperature range (the range for material B) in zone I coincides with the second extremity (0° C.) of the first temperature range (the range for material A) in zone II.

In each zone, a fifth temperature range separates the first extremity of the fourth temperature range from the second extremity of the second temperature range. In these fifth temperature ranges both the second and third thermosensitive materials are inactive. The fifth temperature ranges are of equal breadth (4° C.) and non-overlapping, the fifth temperature ranges being between 28° C. and 32° C. in zone I, 32° C. and 36° C. in zone II and so forth with the fifth temperature range in zone VIII being between 56° C. to 60° C. The fifth temperature ranges together form a second detection range within which the temperature is indicated by one of the zones wherein all three thermosensitive materials are inactive.

Except for the second extremity of the second temperature range in the first zone I and the first extremity of the fourth temperature range in the last zone VIII, the first extremity of the fourth temperature range in one zone coincides with the second extremity of the second temperature range in an adjacent zone, the second extremity of the second temperature range in the first zone I coinciding with the first extremity of the second temperature range in the last zone VIII. For example, the first extremity (36° C.) of the temperature range for material C in zone II coincides with the second extremity (36° C.) of the second temperature range for material B in zone III. The second extremity (28° C.) of the temperature range for material B in zone I coincides with the first extremity (28° C.) of the temperature range for material B in zone VIII. The second extremity (60° C.) of the fourth temperature range for material C in the first zone I coincides with the first extremity (60° C.) of the temperature range for material C in the last zone VIII.

It may also be observed from FIGS. 1 and 6 that the first extremities of the first temperature ranges, that is, the temperature ranges for materials A in zones I–VIII, are displaced from each other. That is, the temperature range for material A in zone I is displaced by 4° C. relative to the temperature range for material A in zone II, the temperature range for material A in zone III is displaced 4° C. relative to the temperature range for material A in zone II, and so forth. The 4° C. displacements together form a third detection range extending from −4° C. to −32° C. and within which the temperature is indicated by the number of zones in which the materials A, B, and C are all inactive. For example, if the temperature is −6° C., all three materials are inactive in zone VIII so that the black substrate shows but in all other zones at least one material (A) is active to thus show color. On the other hand, if the temperature is −10° C., all three materials are inactive in both zones VII and VIII so that the black substrate shows and the other zones all show a color because at least one material (A) is active. Therefore, when the temperature is within the third detection range the temperature may be determined by adding to −6° C. another −4° C. for each black zone in excess of one.

Finally, it may be observed that the second extremities of the fourth temperature ranges, that is, the temperature ranges of materials C, are displaced from each other by 4° C. so as to form a fourth detection range extending from 60° C. to 88° C. In the fourth detection range the temperature is indicated by the number of zones in which materials A, B and C are all inactive so that the black substrate is visible. For example, if the temperature is 70° C., all three materials will be inactive in zones I through III so that black shows for these zones. In zones IV through VIII materials C will be active to show a color. On the other hand, if the temperature is 82° C. all three materials will be inactive in zones I through VI to show black and material C will be active in zones VII and VIII to show color. Thus, if the temperature is hot and falls within the fourth detection range, the temperature may be determined by adding to 62° C. another 4° C. for each black zone in excess of one.

According to two variants of this embodiment, the three thermochromic inks A, B and C can be either mixed or superposed.

Figure 3:
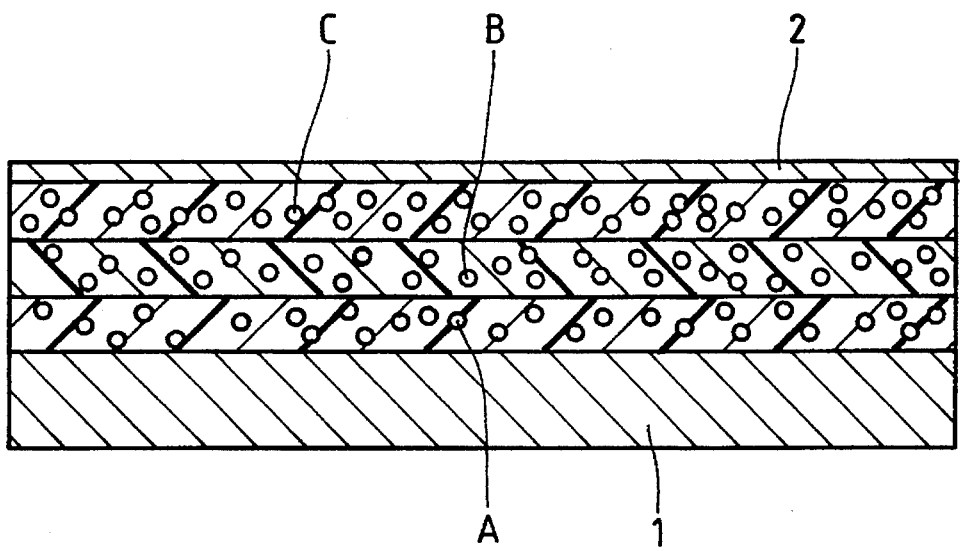
FIG. 3 shows the structure in cross-section of a first variant of this embodiment of the invention.
Figure 4:
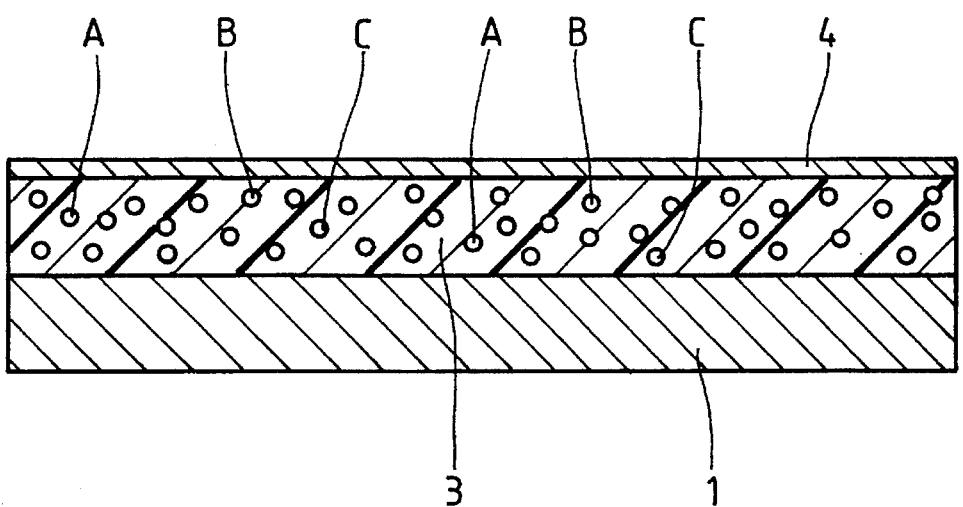
FIG. 4 shows the structure in cross-section of a second variant of this embodiment of the invention.

On FIGS. 3 and 4 can be seen a substrate 1 showing preferably a surface coloured black in a manner to absorb one of the light polarizations. Such substrate 1 is formed of a material exhibiting preferably a high thermal conductivity.

On FIG. 3, inks A, B and C are deposited in three superposed layers, the upper layer being covered over by a transparent protective film 2 which offers, on the one hand, a mechanical protection against scratches and, on the other hand, a protection against ultraviolet radiations increasing there by the lifetime of the indicator.

On FIG. 4, inks A, B and C are respectively encapsulated and mixed each in an equal quantity and in a homogeneous manner in a layer formed by a transparent binder which is also covered over by a protective film 4 equivalent to that shown on FIG. 3.

Figure 5:
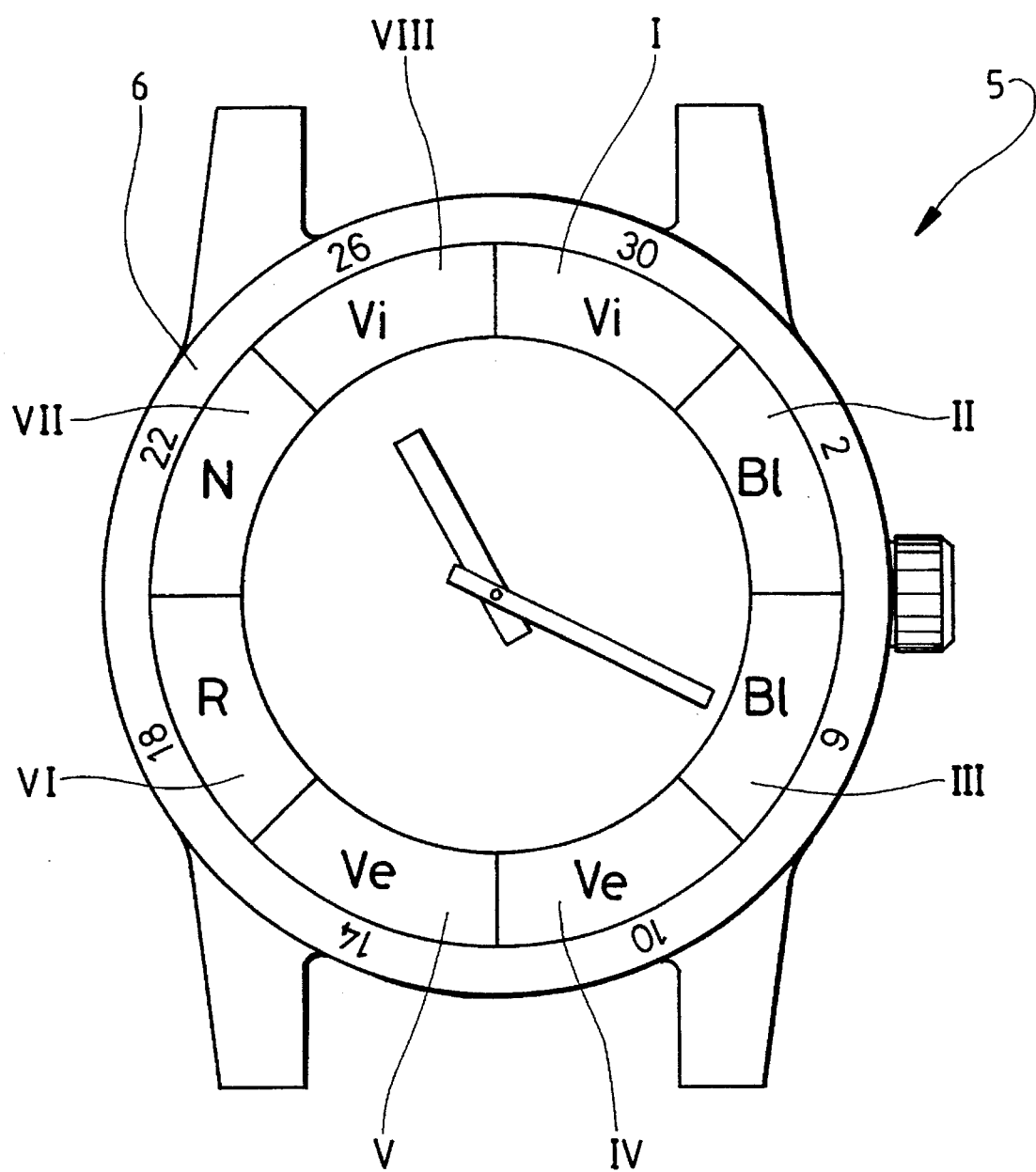
FIG. 5 shows a preferred utilization of the temperature indicator according to the invention.

On FIG. 5, it can be seen that the temperature indicator according to the invention such as previously described can be arranged on a metallic bezel of a wristwatch. Such bezel comprises eight sensors I to VIII. Sensor I is violet Vi, sensors II and III are blue Bl, sensors IV and V are green Ve, sensor VI is red R, sensor VII is black N and sensor VIII is violet Vi. The temperature of 22° C. is read on the temperature scale 6 next to sensor VII which is black.

When the temperature increases by the value of a step, that is to say, 4° C., such sensor VII becomes coloured and the sensor VIII then becomes non-active, thus black, since it will have attained the end of its activity span. The temperature of 26° C. will be read beside sensor VIII.

When the watch is worn, the temperature of the latter is influenced by the temperature of the body of the wearer and that of the ambient medium. If the wearer is in a colder medium than the temperature of the body, the body transmits heat to the watch by thermal conductivity and if the medium is warmer, it is the contrary which occurs. The effect of this influence is to perturbation of the temperature measurement. The temperature in the worn mode must be corrected preferably by a linear approximation.

It is possible to provide different types of watches for which the measurable temperature scale is adapted to the temperature of its utilization, for example watches for which the temperature indicator is adapted for winter sports, for nautical sports, in hot countries or in cold countries.

It will be noted that reading the temperature indicator according to the invention is, contrary to the thermochromic temperature indicators of the prior art, entirely independent of the angle at which the temperature is read. Effectively, the temperature is indicated by the sensor, the inks of which are not active and consequently by the colour of the substrate.

In the embodiment which has just been described, the indicator step is 4° C. As is well understood, this could be different and could be chosen as a function of the desired application. For a given number of sensors N, the desired step determines the span of operation of the inks ΔT by the following formula: ΔT=(N−1)P.

By way of example, if one wishes to provide a temperature indicator according to the invention exhibiting a step of 1° C. and including eight sensors, the operational span of each ink used in the sensors will be 7° C.

It is also understood from the description which precedes that according to a variant, a temperature indicator according to the invention can operate with two inks per sensor on the same principle.

What we claim is:

1. A temperature indicator comprising a substrate having a plurality of distinct juxtaposed zones including a first zone and a last zone; each zone being covered by a first and a second thermosensitive material respectively reacting within a first and a second temperature range each temperature range having a first extremity and a second extremity, said second extremity of said first temperature range of the first thermosensitive material in each respective zone being separated from the first extremity of the second temperature range of the second thermosensitive material in the same zone by a third temperature range in which said first and second thermosensitive materials are both inactive, the third temperature ranges being non-overlapping and distinct from each other and forming together a first detection range within which the temperature is indicated by one of said zones in which said thermosensitive materials are both inactive.

2. A temperature indicator as set forth in claim 1, wherein, except for the second extremity of the first temperature range in the first zone and the first extremity of the second temperature range in the last zone, the first extremity of the second temperature range in one zone coincides with the second extremity of the first temperature range in an adjacent zone.

3. A temperature indicator as set forth in claim 2, wherein the breadth of said third temperature ranges is the same in all the zones.

4. A temperature indicator as set forth in claim 3, wherein the breadths of the first and second temperature ranges of the thermosensitive materials are equal in each zone and the same in all the zones.

5. A temperature indicator as set forth in claim 1, wherein said zones are covered by a third thermosensitive material reacting within a respective fourth temperature range, said fourth temperature range having, in each zone, a first extremity separated from the second extremity of the second temperature range by a fifth temperature range in which the second and the third materials are both inactive, and the respective fifth temperature ranges being non-overlapping and distinct from each other and forming together a second detection range within which the temperature is indicated by one of said zones in which the three thermosensitive materials are inactive.

6. A temperature indicator as set forth in claim 5, wherein, except for the second extremity of the first temperature range in the first zone and the first extremity of the second temperature range in the last zone, the first extremity of the second temperature range in one zone coincides with the second extremity of the first temperature range in an adjacent zone, wherein except for the second extremity of the second temperature range in the first zone and the first extremity of the fourth temperature range in the last zone, the first extremity of the fourth temperature range in one zone coincides with the second extremity of the second temperature range in an adjacent zone, and wherein the second extremity of the second temperature range in the first zone coincides with the first extremity of the second temperature range in the last zone.

7. A temperature indicator as set forth in claim 6, wherein the breadths of the third and fifth temperature ranges are equal in each zone and the same in all the zones.

8. A temperature indicator as set forth in claim 7, wherein the breadth of the first, second and fourth temperature ranges of the three materials are equal in each zone and the same in all the zones.

9. A temperature indicator as set forth in claim 5, wherein the first extremities of the first temperature ranges are displaced from each other so as to form together a third detection range within which the temperature is indicated by the sum of the zones in which the three materials are inactive.

10. A temperature indicator as set forth in claim 9, wherein the second extremities of the fourth temperature ranges are displaced from each other so as to form together a fourth detection range within which the temperature is indicated by the sum of the zones in which the three materials are inactive.

11. A temperature indicator as set forth in claim 1, wherein said zones are arranged in a ring.

12. A temperature indicator as set forth in claim 1, wherein said thermosensitive materials are deposited onto the substrate in superposed layers.

13. A temperature indicator as set forth in claim 1, wherein said thermosensitive materials are encapsulated and mixed in a layer formed from a transparent binder.

14. A temperature indicator as set forth in claim 1, wherein said substrate is formed by a material exhibiting a high thermal conductivity.

15. A temperature indicator as set forth in claim 1, wherein said substrate comprises a black surface on which said thermosensitive materials are deposited.

16. A watch provided with a temperature indicator as set forth in claim 1.

* * * * *